(12) United States Patent  
Doddek et al.

(10) Patent No.: US 8,447,568 B2  
(45) Date of Patent: May 21, 2013

(54) SYSTEM AND METHOD FOR ANALYZING AND REPORTING MACHINE OPERATING PARAMETERS

(75) Inventors: David J. Doddek, Decatur, IL (US); Giles K. Sorrells, Forsyth, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/225,595

(22) Filed: Sep. 6, 2011

(65) Prior Publication Data

US 2011/0320172 A1     Dec. 29, 2011

Related U.S. Application Data

(63) Continuation of application No. 10/025,717, filed on Dec. 19, 2001, now Pat. No. 8,014,974.

(51) Int. Cl.  
*G06F 11/30* (2006.01)

(52) U.S. Cl.  
USPC .......................................................... 702/183

(58) Field of Classification Search  
USPC .......................................................... 702/183  
See application file for complete search history.

(56) References Cited

U.S. PATENT DOCUMENTS

| | | | |
|---|---|---|---|
| 4,258,421 A | 3/1981 | Juhasz et al. | |
| 4,831,539 A | 5/1989 | Hagenbuch | |
| 5,067,572 A | 11/1991 | Kyrtsos et al. | |
| 5,070,953 A | 12/1991 | Kyrtsos et al. | |
| 5,082,071 A | 1/1992 | Kyrtsos et al. | |
| 5,105,895 A | 4/1992 | Kyrtsos | |
| 5,327,347 A | 7/1994 | Hagenbuch | |
| 5,400,018 A | 3/1995 | Scholl et al. | |
| 5,416,706 A | 5/1995 | Hagenbuch | |
| 5,450,321 A | 9/1995 | Crane | |
| 5,463,567 A | 10/1995 | Boen et al. | |
| 5,528,499 A | 6/1996 | Hagenbuch | |
| 5,631,832 A | 5/1997 | Hagenbuch | |
| 5,631,835 A | 5/1997 | Hagenbuch | |
| 5,644,489 A | 7/1997 | Hagenbuch | |
| 5,650,928 A | 7/1997 | Hagenbuch | |
| 5,650,930 A | 7/1997 | Hagenbuch | |
| 5,714,719 A | 2/1998 | Otsuka et al. | |
| 5,737,215 A | 4/1998 | Schricker et al. | |
| 5,742,914 A | 4/1998 | Hagenbuch | |
| 5,754,965 A | 5/1998 | Hagenbuch | |
| 5,758,300 A | 5/1998 | Abe | |
| 5,808,907 A | 9/1998 | Shetty et al. | |
| 5,955,706 A | 9/1999 | Fonkalsrud et al. | |
| 5,995,888 A | 11/1999 | Hagenbuch | |
| 6,141,608 A * | 10/2000 | Rother | 701/29.6 |
| 6,295,492 B1 | 9/2001 | Lang et al. | |
| 6,324,659 B1 | 11/2001 | Pierro | |
| 6,330,499 B1 | 12/2001 | Chou et al. | |
| 6,338,152 B1 | 1/2002 | Fera et al. | |
| 6,370,454 B1 | 4/2002 | Moore | |
| 6,539,296 B2 | 3/2003 | Diaz et al. | |

(Continued)

*Primary Examiner* — Aditya Bhat  
(74) *Attorney, Agent, or Firm* — Finnegan, Henderson, Farabow, Garrett & Dunner LLP

(57) ABSTRACT

A system and method for analyzing and providing exception-based reports for machine data. The machine data is relayed to a remote system for automated analysis based on tests and parameters defined by an owner. If any exceptions are detected in the data based on the operator-defined input, output is generated. The output may take the form of exception-based printed or electronic reports, or the exception information may be relayed to a hand held device, preferably maintained by service personnel at the work site.

19 Claims, 4 Drawing Sheets

U.S. PATENT DOCUMENTS

| | | |
|---|---|---|
| 6,546,363 B1 | 4/2003 | Hagenbuch |
| 6,553,290 B1 | 4/2003 | Pillar |
| 6,611,740 B2 | 8/2003 | Lowrey et al. |
| 6,748,318 B1 | 6/2004 | Jones |
| 6,795,935 B1 | 9/2004 | Unkle et al. |
| 6,810,362 B2 | 10/2004 | Adachi et al. |
| 6,850,824 B2 | 2/2005 | Breed |
| 6,850,869 B2 | 2/2005 | Pierro et al. |
| 6,954,689 B2 | 10/2005 | Hanson et al. |
| 7,792,618 B2 * | 9/2010 | Quigley et al. ............ 701/33 |
| 2002/0156558 A1 * | 10/2002 | Hanson et al. ............ 701/33 |
| 2003/0176958 A1 | 9/2003 | Hagenbuch |
| 2004/0130442 A1 | 7/2004 | Breed et al. |

* cited by examiner

SYSTEM AND METHOD FOR ANALYZING AND REPORTING MACHINE OPERATING PARAMETERS

CROSS-REFERENCE TO RELATED APPLICATIONS

This is a continuation of application Ser. No. 10/025,717, filed Dec. 19, 2001 now U.S. Pat. No. 8,014,974 which is incorporated herein by reference.

TECHNICAL FIELD

The present invention relates generally to machine and application diagnostic systems and, more particularly, to a system and method for selectively processing operating data to provide data indicative of machine performance.

BACKGROUND

For service and diagnostic purposes, work machines are typically equipped with sensors for measuring operating conditions such as engine RPM, oil pressure, water temperature, boost pressure, oil contamination, electric motor current, hydraulic pressure, system voltage, and the like. Further, additional sensors may measure other machine application conditions, such as payload, tire performance, underfoot conditions, and the like. In some cases, storage devices are provided on the work machine to compile a database for later evaluation of machine performance and to aid in diagnosis. Service, operations and production personnel, through the use of a communication service tool, examine the accrued data to get a better picture of the causes of the failure and aid in diagnosis or to evaluate the machine's operation and if it is being operated within defined tolerances such as payload, etc. Similarly, service, operations and production personnel can evaluate the stored data to predict future failures and correct any problems prior to total component failure. In addition, this data may be examined by service, operations, production or other supervisory personnel to evaluate machine and/or operator performance or application severity to ensure maximum productivity of the machine.

Rather than requiring analysis of the data on the machine at the work site, other systems have provided a means for downloading the machine data to a remote database for analysis; collecting the data for several machines may be useful for analyzing the performance of a fleet of machines, and the collection of data in one location may minimize service calls by allowing service personnel to monitor several machines from one location. However, the quantity of diagnostic data which personnel must manually review to diagnose machine issues is vast. Service, operations and production personnel may be able to review all of the data collected from one machine to determine if it is operating normally. However, for the personnel to review all of the data for a fleet of machines in this manner is cost and time prohibitive. There may even be a negative commercial impact with such off-board systems in that the systems are purchased and then not utilized once the complexity of the manual analysis becomes clear. Thus, data is collected and stored, but not analyzed, resulting in failures of the machines or lower machine productivity even though a substantial financial investment has been made in the system.

These issues are particularly relevant to large work machines such as off-highway mining trucks, hydraulic excavators, track-type tractors, wheel loaders, and the like. These machines represent large capital investments and are capable of substantial productivity when operating. It is therefore important to predict failures so servicing can be scheduled during periods in which productivity will be less affected and so minor problems can be repaired before they lead to catastrophic failures, and it is important to monitor machine and operator performance to increase productivity.

The present invention is directed to solving one or more of the problems as set forth above.

SUMMARY OF THE INVENTION

It is to be understood that both the foregoing general description and the following detailed description are exemplary and explanatory only and are not restrictive of the invention as claimed.

In a first embodiment, the present invention comprises a method for analyzing machine data, the machine data representing at least one condition of a machine. The method comprises storing said machine data in a data system for storage; defining a procedure from pre-defined owner input; processing said machine data based on said procedure to determine a machine exception; and generating a notification in the event of said machine exception.

In a second embodiment, the present invention comprises a system for analyzing machine data, the machine data representing at least one condition of a machine. The system comprises a data system for storing said machine data and an analyzer for accepting a defined procedure from an owner, said analyzer processing said machine data based upon said procedure to determine a machine exception and generating a notification in the event of said machine exception.

BRIEF DESCRIPTION OF THE DRAWINGS

The accompanying drawings illustrate exemplary embodiments of the invention and, together with the description, serve to explain the principles of the invention.

DETAILED DESCRIPTION

Reference will now be made in detail to embodiments of the invention, examples of which are illustrated in the accompanying drawings. Whenever possible, the same reference numbers will be used throughout the drawings to refer to the same or like parts.

In this application, in addition to any ordinary meaning, the term "operably connected" means any system or method for establishing communication and/or data transfer. Such systems or methods may include, for example, electronics, optics, radio, cellular, and/or sound techniques as well as others not expressly described herein. "Operably connected" is not intended to be limited to a hard-wired form of communication or data transfer.

In this application, in addition to any ordinary meaning, the term "owner" means any person or entity responsible for the machine and/or having the authority to monitor the condition of the machine. In some instances, for example, the term "owner" may encompass a person or entity renting a machine and desiring to monitor the machine during the rental period.

Figure 1:
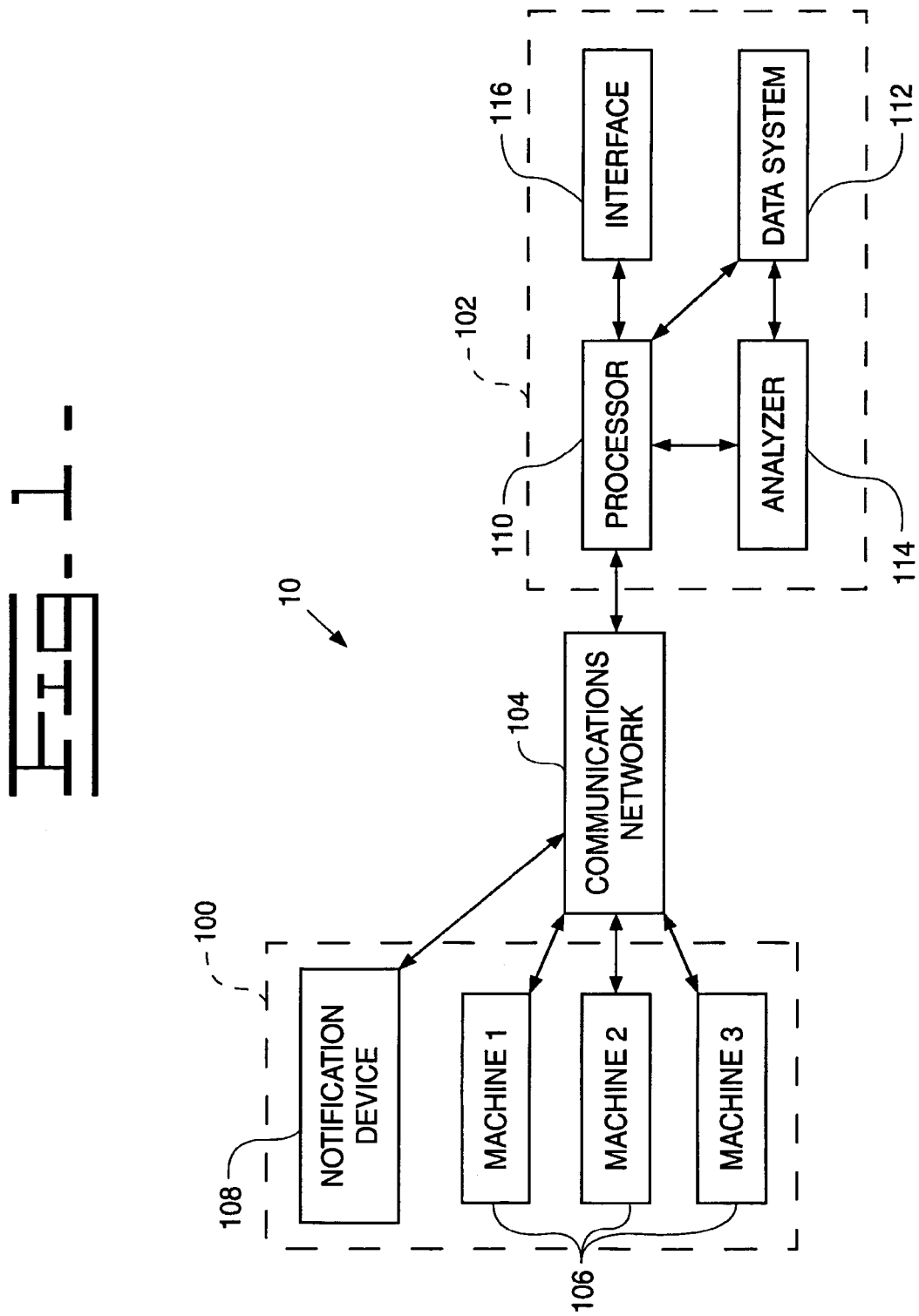
FIG. 1 is a block diagram of a system for automating the analysis of machine data and the notification of exception-based events consistent with an exemplary embodiment of the present invention.

FIG. 1 illustrates a system consistent with an exemplary embodiment of the present invention, which is generally designated 10. For purposes of this disclosure, the present invention is described in connection with a remotely-located work machine, such as an off-highway mining truck, hydraulic excavator, track-type tractor, wheel loader, and the like. However, the present invention is equally well-suited for use with other equipment or machines having control and monitoring systems which produce data for analysis. Further, the present invention is typically described in connection with the analysis of information collected from one machine; however, the invention may be utilized to collect data from one machine or a plurality of machines.

The system preferably includes an on site component 100 and a remote component 102, operably connected by a communications network 104. The on site component 100 includes at least one work machine 106. In FIG. 1, the on site component 100 is depicted as including three work machines 106; however, the present invention is equally applicable for on site components 100 having a greater or lesser number of work machines 106. Further, even though in FIG. 1 the work machines 106 are depicted as being related to one another and grouped in one on site component 100, the present invention may include work machines 106 from a variety of on site components 100. In other words, the present invention may include a variety of machines 106 from a variety of work sites, such as, for example, mine sites. The on site component 100 further is comprised of at least one notification device 108, such as, for example, a handheld communications device, which is well known in the art. Preferably, the handheld communications device is a pager, cellular phone, personal digital assistant or the like. Alternatively, the notification device 108 may be a desktop computer or any other means for producing an alert known in the art, such as, for example an electronic message. The machines 106 and the notification device 108 preferably are operably connected with and communicate with a communications network 104. Preferably, the communications network 104 communicates by wireless communication means, such as radio, satellite or cellular technology, which are well known by those skilled in the art. However, the communications network 104 may include an alternate communication means, such as a modem with access to public telephone lines.

The remote component 102 preferably is comprised of a processor 110, data system 112, analyzer 114, and interface 116. The remote component 102 may be located at the work site or elsewhere. Especially if machines 106 from more than one work site are associated with the on site component 100, the remote component 102 need not be associated with a single work site. The remote component 102 may be in a central location to which machine information from a plurality of work sites is delivered for processing and analysis. Alternatively, the remote component 102 may be located on a work machine and operably connected to the machine's monitoring system (not shown) to collect information; further, the remote component 102, while located on one machine, may, via the communications network 102, continue to collect data from the plurality of machines 106 at one or more work sites.

The processor 110 controls the functioning of the remote component 102 and receives communications from the communications network 104, preferably by wireless communications means, as described above. The analyzer 114 is operably connected to the processor 110; the analyzer 114 processes the machine data for diagnostics and prognostics. The analyzer 114 may be a hardware and/or software system separate from the processor 110, or it may be software which resides on the processor 110. The data system 112 is operably connected to the processor 110 and to the analyzer 114; the data system 112 stores the machine data received from the machines 106 via the communications network 104. The data system 112 may be comprised of a single database, or it may be comprised or a plurality of databases located on one or more computing devices or servers; the data system 112 may further comprise a processor or controller (not shown) for managing the storage of data. The interface 116 is operably connected to the processor 110 and provides a means for communication with the remote component 102. The interface 116 preferably includes a display (not shown) and an operator input device, such as a keyboard (not shown). However, other types of interface means, such as, for example, a hand held computing device, voice recognition means, a touch screen, or the like, may be used to interface with the remote component 102.

The analyzer 114, processor 110, data system 112, and interface 116 may reside on a single computer, as is well known in the art. Alternatively, each of these components 114, 110, 112, and 116 may reside on its own computer or server or in any combination, depending, at least in part, on the complexity of the installation, the number of machines 106 providing data to the remote component 102, and the amount of data being processed.

Operation of the system is controlled by software that is preferably programmed into the analyzer 114 or processor 110 by external means. Alternatively, the program can be implemented via hardware or any other programming technique. Creation of this software based upon the description set forth in the specification is within the capabilities of one having ordinary skill in the programming arts.

Figure 2:
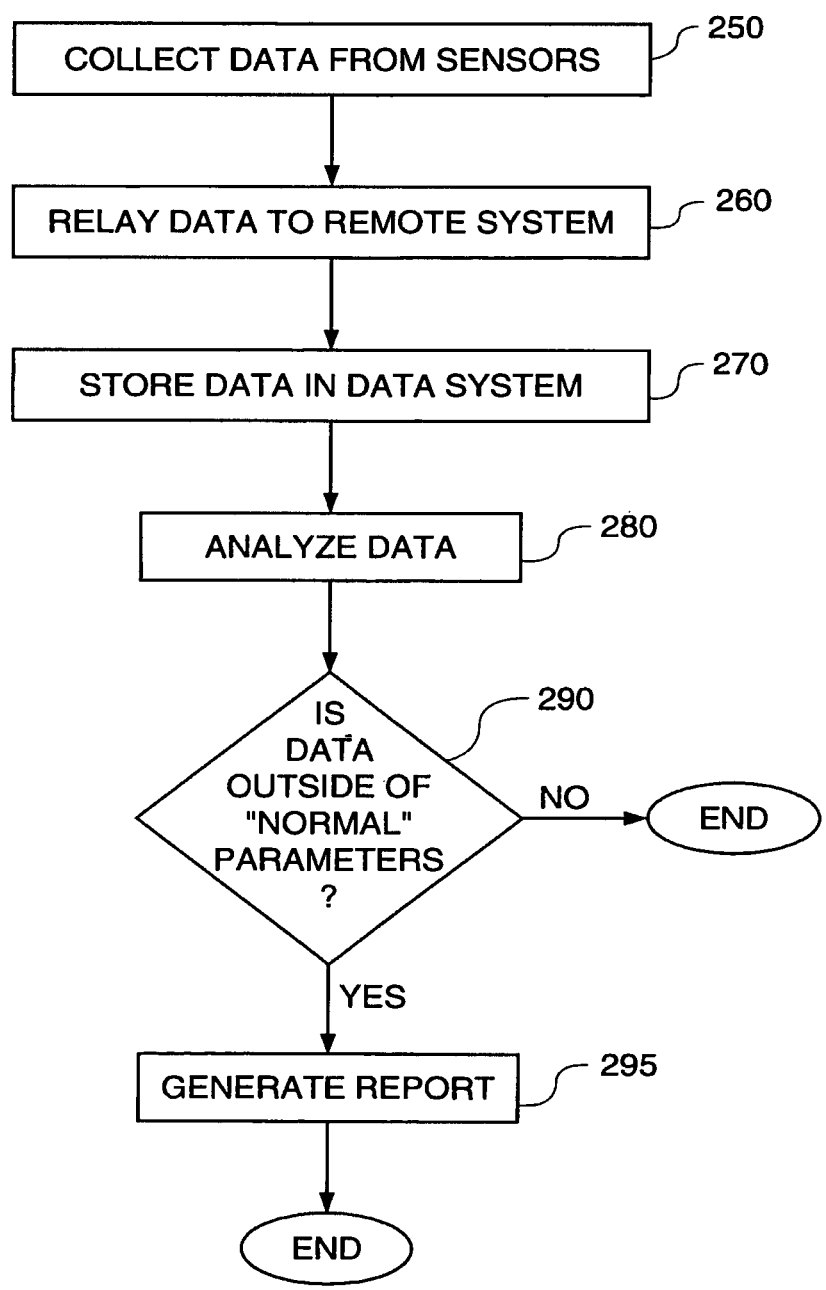
FIG. 2 is a flow chart of an exemplary embodiment of a method, consistent with the present invention, for analyzing machine data.

As seen in FIG. 2, preferably, as seen in control block 250, the machine's monitoring system (not shown) collects machine data related to the operating conditions of the machine 106, such as, for example, engine RPM, oil pressure, water temperature, boost pressure, oil contamination, electric motor current, hydraulic pressure, system voltage, and the like and related to other application conditions of the machine, such as, for example, payload, tire performance, underfoot conditions and the like. The data is preferably collected by sensors (not shown) residing on the machine 106, which comprise the machine monitoring system. As seen in control blocks 260 and 270, the machine data is relayed via the communications network 104 to the data system 112 and stored in the data system 112. The data may be relayed from the machine 106 as streaming data in real time, as is well known in the art. Alternatively, the data may be stored on the machine 106 and batched, or relayed to the data system 112 in packets. The packets may be relayed frequently, such as, for example, every minute, or the packets may be sent more infrequently, such as, for example, at the end of a work shift or every twenty-four hours. As seen in control blocks 280 and 290, the machine data is analyzed to determine if it is outside of "normal" parameters. If the data is not, the application ends. If it is, as seen in control block 295, a report is generated. In other words, only exceptions to normal operating and machine application conditions are reported, thus minimizing the data and analysis which must be reviewed by service, operations and production personnel.

Figure 3:
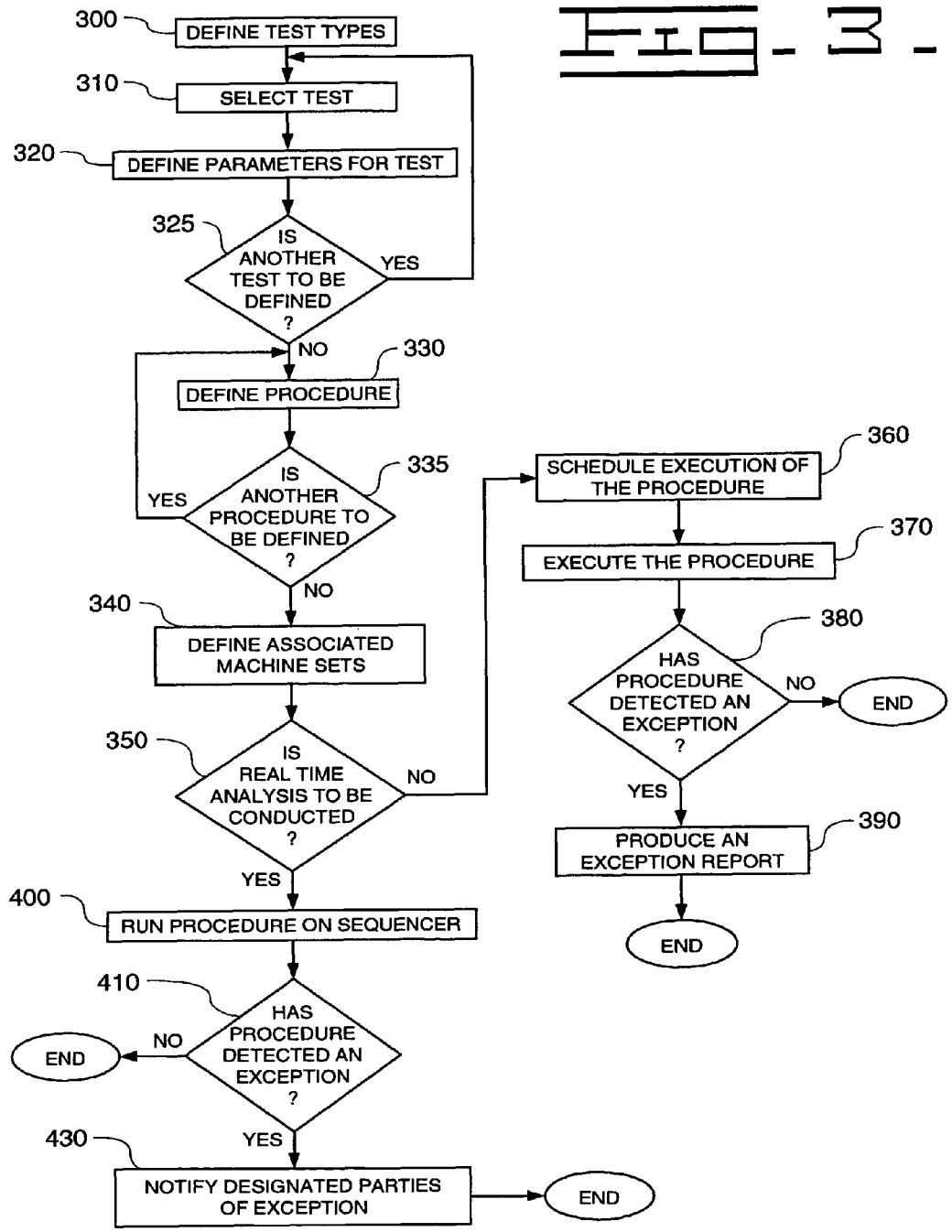
FIG. 3 is a flow chart of an exemplary embodiment of a method, consistent with the present invention, for automating the analysis of machine data and the notification of exception-based events.

The analysis of the data (control block 280) is performed by the analyzer 114, and the steps for this analysis are seen in FIG. 3. As discussed below, preferably, the analyzer 114 requires that the owner define the tests and the operating and machine application parameters to be considered normal on the machine; then the analyzer 114 conducts the tests and produces a report detailing any exceptions detected in the machine data.

As seen in FIG. 3, in the first analysis step, in control block 300, test types are defined. The test types are preferably pre-defined through the analyzer 114 and the monitoring system of the work machine 106. For example, test types may include engine speed, oil pressure, payload, and the like. For each of these test types, sensors and/or electronic control modules must be placed on the machine 106 in order to measure the speed, pressure, or load. In addition, the test types are pre-defined in the analyzer 114 to correspond to the available sensors and/or control modules installed on the machine 106. Preferably, the test types are defined during the assembly of the machine 106 when the sensors are installed, and the analyzer 114 is programmed to accept the test types defined by the installed sensors. Alternatively, if desired by the owner, the machine 106 may be retrofitted with sensors to measure specific operating conditions.

In control block 310, a specific test to be performed is selected in the analyzer 114, preferably by the owner via the interface 116. The test is selected from the plurality of test types defined in control block 300. Preferably, the owner select one test to be run on the machine data stored in the data system 112, such as, for example, analyzing the engine speed or oil pressure. Alternatively, the owner may select more than one test to be run on the machine data.

Figure 4:
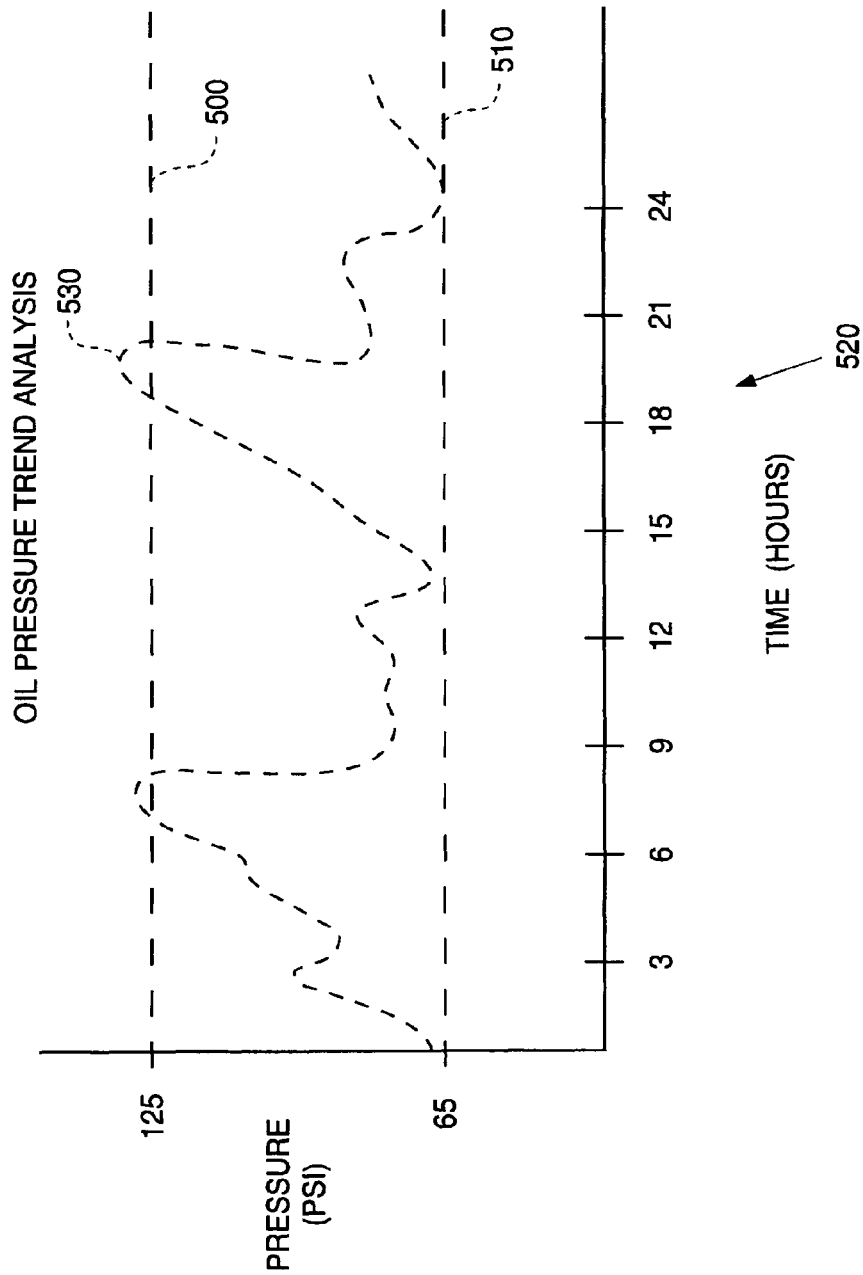
FIG. 4 is an exemplary graph, consistent with the present invention, depicting an exemplary set of parameters to be defined by the owner.

In control block 320, the parameters for the selected test are defined, preferably by the owner via the interface 116. The parameters are, for example, acceptable values or values for the machine data which are considered "normal" and which will not trigger an exception. As seen in FIG. 4, which is an exemplary graph of a trend analysis for oil pressure for a work machine and does not necessarily represent actual acceptable values or parameters, the owner may define parameters such as, for example, the upper and lower limits 500 and 510, the width, or time over which the analysis is to be conducted, 520, and the number of allowable spikes 530. As seen in FIG. 4, for example, for engine oil pressure, the owner-defined parameters are upper and lower limits of 125 and 65 psi, respectively; the width is defined as twenty-four hours. Further, the number of allowable spikes may be defined by the owner as four (not shown). Thus, the graph depicted in FIG. 4 would not trigger an exception as it contains only two spikes outside of the acceptable limits. Preferably, the analyzer 114 contains pre-defined parameters associated with the test types so that an owner may select from the pre-defined parameters if he or she does not desire to define custom parameters. Further, each test type may have several pre-defined parameters associated with it from which the owner may select; for example, the oil pressure test type may have different upper and lower limits for when the machine is operating in different temperature conditions or based on machine life. However, the owner may also set his or her own parameters for the selected test.

Returning to FIG. 3, as seen in control block 325, the owner determines if additional tests need to be defined. If so, control returns to control block 310 so that another test may be selected and associated parameters defined. For example, if the owner defined a test for oil pressure with a set of associated parameters, the owner may wish to define a second, unrelated, test for engine speed (as long as engine speed is one of the pre-defined test types). In addition, if the owner has defined one test for oil pressure with a first set of associated parameters, the owner may define a second test, also for oil pressure, with a second set of associated parameters. Once the owner has defined all desired tests, control continues to control block 330.

As seen in control block 330, the procedure is defined, preferably by the owner via the interface 116. To define the procedure, the owner preferably defines a script comprised of one or more tests to be run. For example, a procedure may consist of conducting a single test for oil pressure. A procedure may also consist of conducting two (or more) tests, such as, for example, for oil pressure and engine speed. Further, a procedure may consist of conducting a test and conditioning a second test on the results of the first test. For example, a procedure, which may be labeled "overboost," may perform a test on the engine boost pressure. If an exception is generated by this test, i.e. if the boost pressure is too high and operating outside of the defined limits, a second test or round of tests, such as oil pressure and/or engine speed, may be conducted to test the conditions which may be contributing to the boost pressure exception.

As seen in control block 335, the owner determines if additional procedures should be defined. If so, control returns to control block 330 so that an additional procedure may be defined. For example, if an owner defined a procedure including a single test for oil pressure, the owner may wish to define a second procedure for analyzing overboost, as described above. Once the owner has defined all desired procedures, control proceeds to control block 340. The continuing method of the present invention is described as though only one procedure is defined. However, it is to be understood that a multitude of procedures may be conducted on the machine data in the following steps.

As seen in control block 340, the machine sets are defined in order to group the data stored in the data system 112. Defining the machine sets allows the data to be grouped for association with the procedures. The machines 106 may be grouped into a variety of fleets, and one or more fleets associated with the procedure. The fleets may be determined based on commonalities among the machines 106, such as, for example, by operation at a single work site, by age, and the like. In addition, a procedure may have only one machine 106 associated with it. Further, the grouped fleets of machines 106 may be saved for association with a variety of procedures. In addition, the procedure may have more than one group or fleet of machines 106 associated with it; the procedure will than be run on each of the groups of machines 106 and the results reported separately. For example, a procedure comprised of an oil pressure analysis may be associated with a single machine which the owner believes is near the end of its useful life and needs careful monitoring. Further, the same procedure comprised of the oil pressure test may also be associated with a fleet of machines 106 operating in harsh, desert conditions; they may need monitoring as a group, for example, to ensure they are capable of operating in such an environment.

In control block 350, the owner determines if a real time analysis should be conducted on the machine data. The machine data may be continuously downloaded, or "streamed," to the data system 112, or it may be stored on the machine 106 for a period of time, with several hours or days worth of data sent to the data system 112 at one time, i.e. "batched." If the data is streamed to the data system 112 or if the data is frequently batched, such as every several minutes, a "real time" analysis may be conducted on the data, allowing for immediate notification of machines 106 which may need maintenance or may be operating at less than maximum productivity. Otherwise, if the data is streamed or batched, the owner may request a standard analysis to be performed on the machine data. As seen in control block 350, the user may select a standard or real time analysis to be conducted on the machine data based, at least in part, on the frequency data is relayed and the needs of the owner.

If a standard analysis is to be run, control passes to control block 360, in which the procedure is scheduled to be executed. The owner may schedule the procedure to be run at any time, such as, for example, in the middle of the night or during other off-hours.

As seen in control block 370, the procedure is next executed according to the schedule. Executing the procedure includes executing all of the tests defined in the procedure. Thus, more than one test may be run if the procedure is comprised of several tests. If one test generates an exception, the procedure is reviewed to determine if that test conditions a second test, i.e. if an exception generated by the first test indicates that a second test should be run on the same or other data. If so, the second, or additional, test is executed. If the second test generates an exception, the procedure is determined to have generated an exception. In addition, if the second test does not generate an exception, but the first test does, the procedure is also determined to have generated an exception as it is expected the owner would desire to review any exceptions found in the data. Alternatively, if the second test does not generate an exception, the procedure may be determined also not to generate an exception.

As seen in control block 380, the output from the procedure is reviewed by the analyzer 114 to determine if an exception has been generated. If no exception is generated from the procedure, control ends, and no report or other output is generated. If the procedure does generate an exception, then as seen in control block 390, an exception report is produced which provides information on the tests and/or procedures which generated exceptions. The exception report may be automatically printed by the analyzer 114, or the report may be produced and electronically mailed to the owner or a specified group, or the report may be disseminated by other means known in the art, such as, for example, by being posted on a web site. Preferably, various versions of the report may be produced for dissemination to various parties. For example, a management version may be produced which generally outlines the exceptions noted, and a service version may be generated which provides greater detail on the exceptions, such as, for example, data associated with the exception. Once the report is produced, control ends.

If, in control block 350, real time analysis is to be conducted, then control proceeds to control block 400, in which the procedure is executed on a sequencer (not shown). The sequencer polls the data system preferably every few minutes, such as, for example, every five minutes, and runs the procedure against the data currently in the data system 112. Thus, each time the procedure is run, it encompasses all of the data, including any data recently received, in the analysis. For example, if the procedure is comprised of an oil pressure trend analysis (as described above in relation to FIG. 4), an exception may be generated if the measured oil pressure spikes outside of the defined limits four times or more in one hour. Similarly to the standard analysis, executing the procedure includes executing all of the tests defined in the procedure. Thus, more than one test may be run on the sequencer if the procedure is comprised of several tests. If one test generates an exception, the procedure is reviewed to determine if that test conditions a second test, i.e. if an exception generated by the first test indicates that a second test should be run on the same or other data. If so, the second, or additional, test is executed on the sequencer. If the second test generates an exception, the procedure is determined to have generated an exception. In addition, if the second test does not generate an exception, but the first test does, the procedure is also determined to have generated an exception as it is expected the owner would desire to review any exceptions found in the data. Alternatively, if the second test does not generate an exception, the procedure may be determined also not to generate an exception.

As seen in control block 410, control determines if the procedure has detected an exception. If no exception is detected, control ends. If an exception is generated by the procedure, then, as seen in control block 430, the owner or another designated party is notified as to the exception. Alternatively or in addition to the notification, an exception report may be generated. The notification, or alert, preferably is relayed via the communications network 104 to the notification device 108; as stated, preferably the notification device 108 is a hand held communications device. This device 108 is preferably maintained by service personnel or another party located at the work site. Alternatively, the notification device 108 may be a computer preferably located in a work site office or other convenient location. Thus, preferably a responsible party at the site will be notified when a machine is operating outside of normal parameters, potentially allowing for intervention and prevention of a catastrophic failure of the machine or for intervention and correction of operation errors.

INDUSTRIAL APPLICABILITY

The present invention provides an efficient and automated system and method for analyzing machine data generated by the monitoring systems of work machines and for generating appropriate output when exceptions in the data are detected.

The large quantities of data generated by work machines 106 at a work site, such as, for example, a mine site, is downloaded into a data system 112, which may be located remotely from the work site. The data is reviewed and analyzed automatically based upon the tests requested and parameters defined by an owner, rather than requiring the owner to review sheets of data to determine if the machine is operating outside of normal parameters. Output is generated only if exceptions are found in the analyzed data, which is generally termed exception-based reporting. The exceptions are defined by the owner through his or her defining the tests and parameters, which may be customized based upon the work environment, the age of the machine, and the like. The exception-based reports may take the form of printed or electronically-based reports; however, if the data being analyzed is streamed and, therefore, real-time, or is batched frequently, such as, for example, every five minutes, and relayed to the data system, the exception-based reports may also take the form of automatic notifications to a notification device 108, i.e. a hand-held device, preferably maintained by the site personnel or service personnel. Thus, it is possible for the machines 106, when operating outside of normal parameters, to be brought off line for repair prior to catastrophic failure or for adjustments to be made to their operation to increase productivity.

It will be readily apparent to those skilled in the art that various changes and modifications of an obvious nature may be made, and all such changes and modifications are considered to fall within the scope of the appended claims. Other embodiments of the invention will be apparent to those skilled in the art from consideration of the specification and practice of the invention as disclosed herein. It is intended that the specification and examples be considered as exemplary only, with a true scope and spirit of the invention being indicated by the following claims and their equivalents.

What is claimed is:

1. A method of diagnosing a machine, comprising:
    transmitting operating parameter data from a plurality of machines to a remotely located control system configured to receive the transmitted data;
    storing the received operating parameter data from the plurality of machines on the control system;
    selecting at least one test to be performed on the stored data by selecting from a plurality of available tests;
    defining a plurality of machine sets by grouping machines of the plurality of machines into different groups based on commonalities amongst the machines in a group; and
    selectively executing the at least one test on a machine set of the plurality of machine sets.

2. The method of claim 1, wherein selecting the at least one test includes defining at least one testing procedure, wherein defining the at least one testing procedure includes defining a script comprised of one or more tests of the at least one test to be conducted automatically on the stored data.

3. The method of claim 2, wherein defining the at least one testing procedure includes defining at least one test that is to be automatically conducted based on a result of another test.

4. The method of claim 1, further including collecting the operating parameter data using one or more sensors coupled to each machine of the plurality of machines.

5. The method of claim 4, wherein the plurality of machines includes one or more machines operating at a first work site and one or more machines operating at a second work site remote from the first work site.

6. The method of claim 1, wherein defining at least one test includes defining one or more parameters associated with the at least one test, wherein the one or more parameters include values of operating parameter data that indicate a normal operation of a machine of the plurality of machines.

7. The method of claim 1, further including reporting a result of the executed test, the result being reported only if the executed test indicates a fault.

8. A method of diagnosing a machine, comprising:
    collecting operating parameter data from a plurality of machines operating at a first work site;
    transmitting the data to a computer system located at a location remote from the first work site;
    storing the transmitted data in a storage device of the computer system;
    defining a plurality of machine sets by grouping machines of the plurality of machines into different groups based on commonalities amongst the machines in a group;
    associating the stored data with a machine set of the plurality of machine sets based on a source of the data;
    selecting at least one test to be performed on the associated data;
    selectively performing the at least one test on a machine set of the plurality of machine sets; and
    selectively reporting a result based on an outcome of a test of the at least one test.

9. The method of claim 8, wherein selective reporting the result includes transmitting the result to a display located at the first work site.

10. The method of claim 8, wherein selectively reporting the result includes reporting the result only if the outcome of the test indicates a defect in a machine.

11. The method of claim 8, wherein selecting at least one test includes selecting one or more tests from a list of available tests stored in the computer system.

12. The method of claim 8, wherein selecting one or more tests includes selecting at least one parameter associated with at least one test of the one or more tests.

13. The method of claim 8, further including selecting whether or not the selected at least one test should be conducted in a real time manner.

14. The method of claim 8, wherein performing the selected at least one test includes performing the at least one test on the stored data at a first time and automatically repeating the at least one test on the stored data at a second time later than the first time.

15. The method of claim 8, wherein selecting at least one test includes choosing a time for performance of the at least one test, and performing the at least one test includes performing the at least one test at the chosen time.

16. A computer based system for diagnosis of a machine, comprising:
    a storage device storing operating parameter data of a plurality of machines, the storage device being located remote from the plurality of machines; and
    a processor configured to:
        define a plurality of machine sets by grouping machines of the plurality of machines into different groups based on commonalities amongst the machines in a group;
        associate the stored data with a machine set of the plurality of machine sets based on a source of the data;
        enable the selection of at least one test to be performed on the associated data from a plurality of available tests;
        selectively perform the at least one test on a machine set of the plurality of machine sets; and
        report a result of the at least one test if the result indicates a defect in a machine.

17. The computer based system of claim 16, wherein the plurality of machines include machines that are located at different work sites.

18. The computer based system of claim 16, wherein each of the plurality of machines include sensors configured to acquire operating parameter data.

19. The computer based system of claim 16, further including one or more transmitters configured to wirelessly transmit data from the plurality of machines to the storage device.

* * * * *